Oct. 16, 1956   J. H. WILSON   2,766,628
POWER TAKE-OFF FOR TRUCKS
Filed Nov. 15, 1954   3 Sheets-Sheet 1
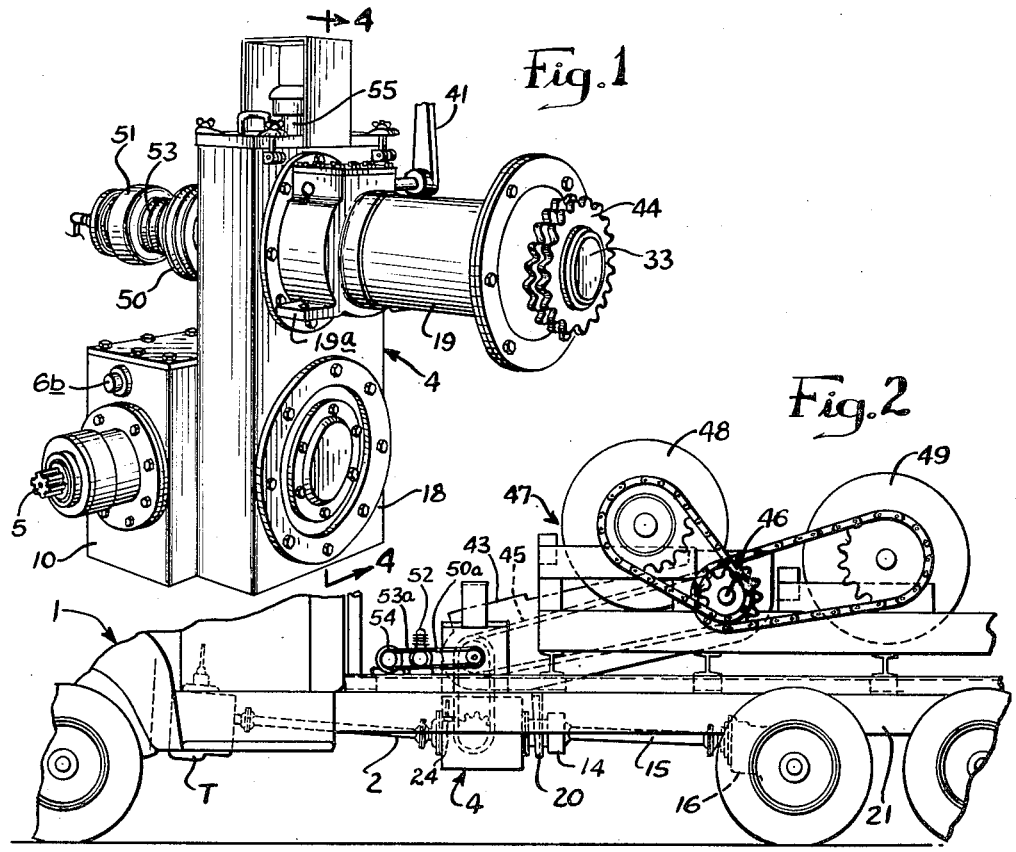
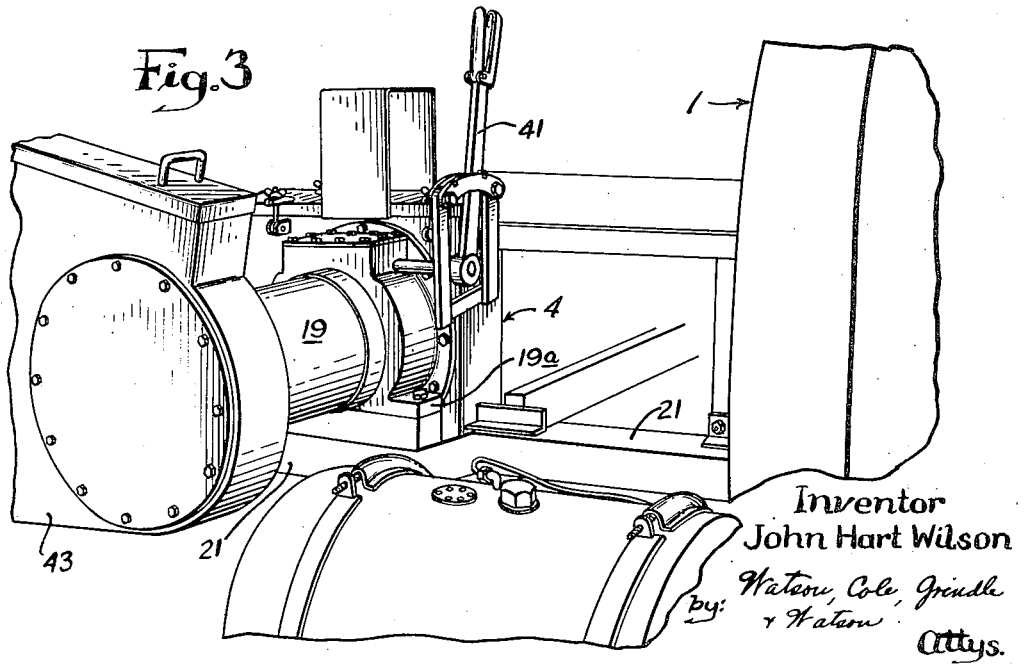
Inventor
John Hart Wilson
by: Watson, Cole, Grindle & Watson
Attys.

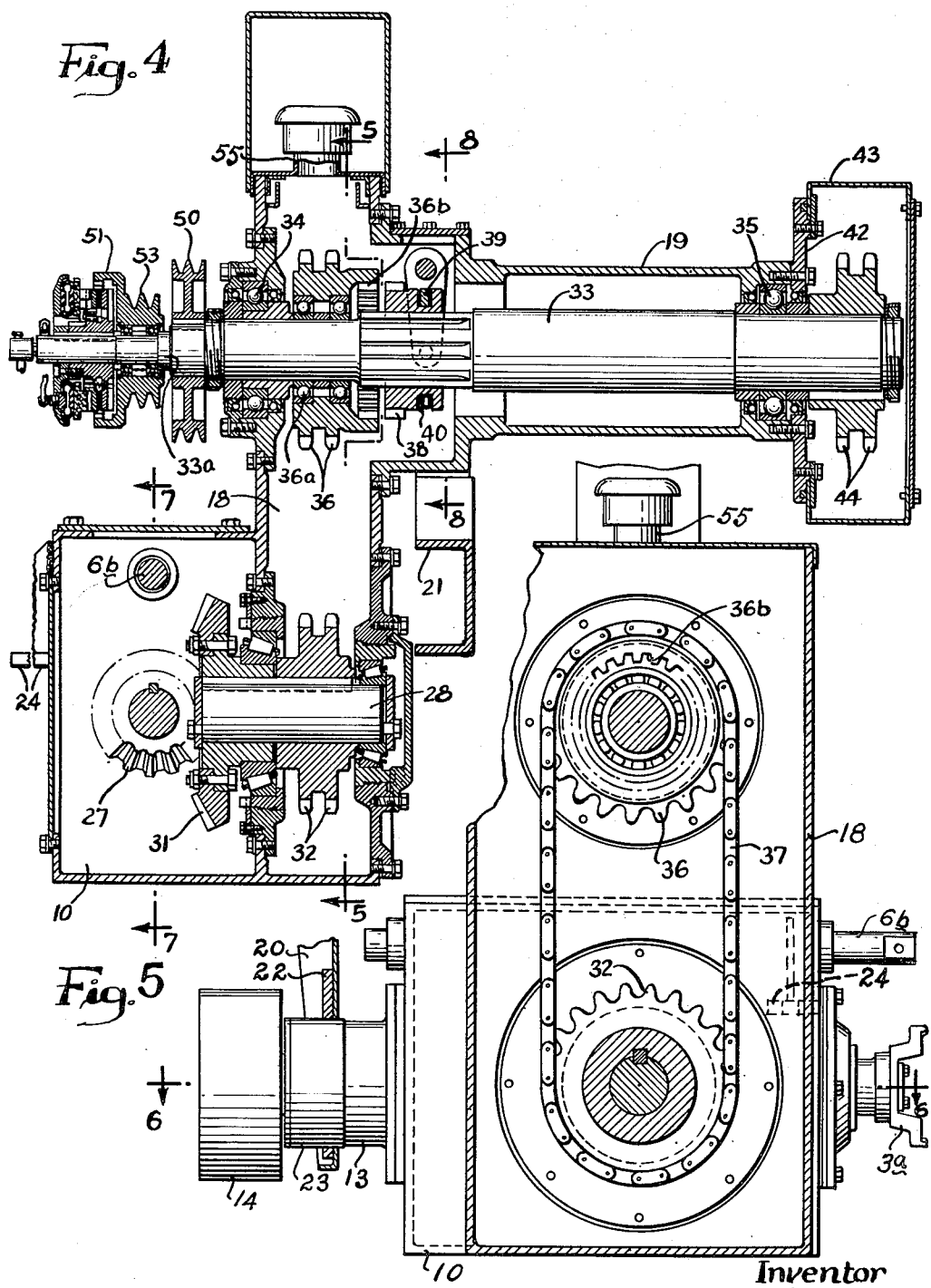

Oct. 16, 1956  J. H. WILSON  2,766,628
POWER TAKE-OFF FOR TRUCKS
Filed Nov. 15, 1954  3 Sheets-Sheet 3
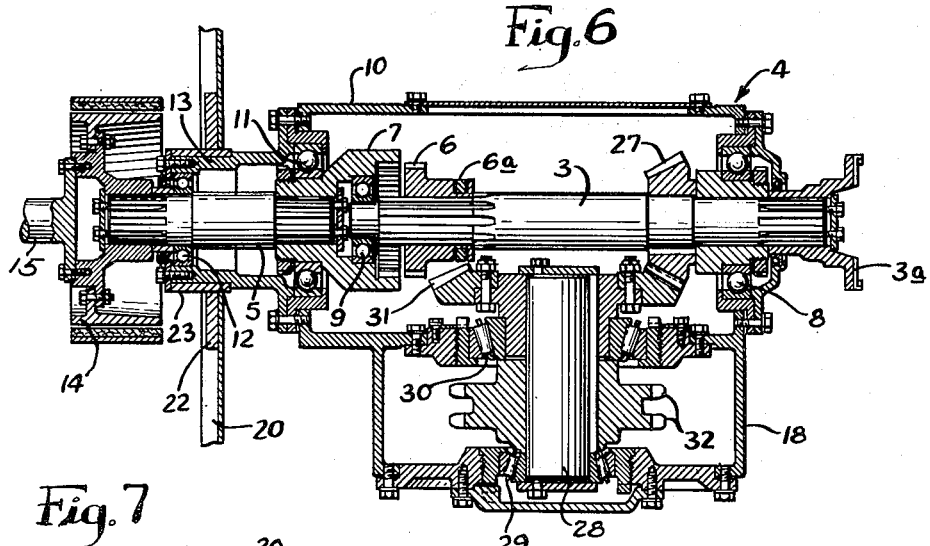
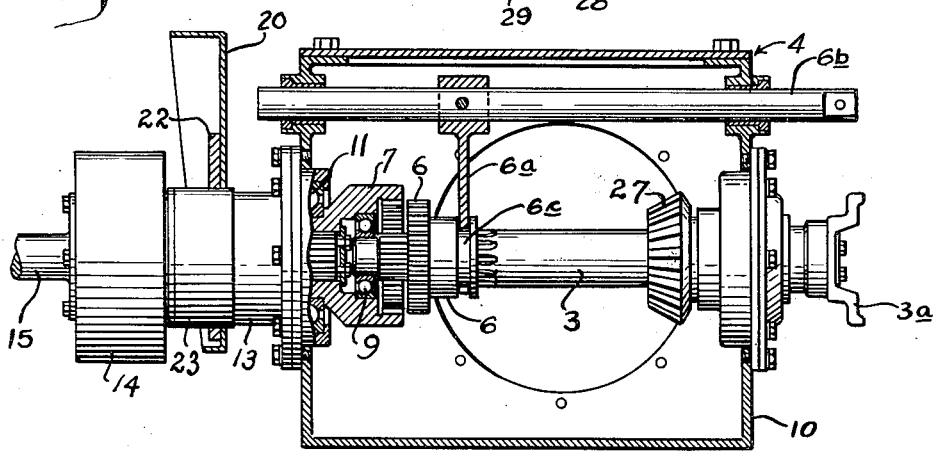
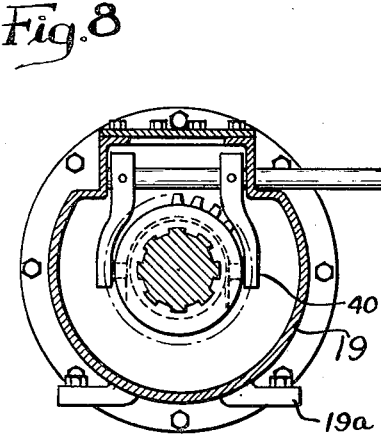
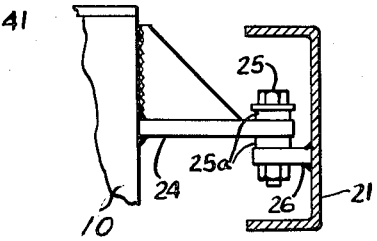
Inventor
John Hart Wilson
by: Watson, Cole, Grindle & Watson
Attys.

United States Patent Office 2,766,628
Patented Oct. 16, 1956

2,766,628

POWER TAKE-OFF FOR TRUCKS

John Hart Wilson, Wichita Falls, Tex.

Application November 15, 1954, Serial No. 468,850

8 Claims. (Cl. 74—15.88)

This invention relates to improvements in power take-offs for trucks, and more particularly to power take-offs for use with heavy duty equipment that is mounted on the truck frame, such as a clean-out rig, an oil and gas well rod and tubing pulling machine, a drilling rig, or the like.

Various power take-offs have been proposed heretofore, but these for the most part, were of a construction which would not lend themselves readily to the transmission of the power upward within the truck frame, laterally outward to a point above and outside the frame and rearward thereof so as to drive large winch drums or the like.

The present power take-off is so constructed as to have a tower shaft, one end of which extends outward over the upper side of the truck frame for driving winch drums and the like, and the other end of which extends inward and may be used to operate such equipment as a pump, an air compressor, and electric generator, or the like.

The construction of the present power take-off is such that it may be installed within a truck frame, and the front portion of the drive shaft of the truck coupled so as to drive through the power take-off to the rear portion of the drive shaft so as to drive the rear axle of the truck, on which axle the rear wheels of the truck are mounted. A clutch is provided within the power take-off to selectively engage the front portion of the drive shaft with the rear portion of the drive shaft, or to selectively disengage the front portion of the drive shaft from the rear portion thereof. A tower shaft is journaled within the housing of the power take-off, transversely of the truck drive shaft and is connected in driving relation therewith, and which tower shaft has a clutch thereon for selectively engaging with an disengaging from the truck drive shaft, irrespective of the engagement or disengagement of the first mentioned clutch which engages the front portion of the drive shaft and the rear portion of the drive shaft.

The tower shaft sprocket is connected with the front portion of the drive shaft at all times, through bevel gear and sprocket and chain arrangement, whereby the speed from the drive shaft to the tower shaft sprocket and tower shaft is materially reduced and the torque increased so the power may be transmitted from the engine of the truck through the drive shaft and power take-off geared to the tower shaft to drive a winch drum or the like from one end of the tower shaft, and a hydraulic pump, an air compressor, an electric generator or the like driven from the opposite end of the tower shaft. The clutches within the power take-off, both the clutch that engages the drive shaft in driving relation, and the clutch which engages the tower shaft with the drive shaft, may be selectively engaged to drive the tower shaft either while the rear axle of the truck is being driven, or while the rear axle of the truck is not being driven.

An object of this invention is to provide a power take-off for a truck which turns the power at a right angle to the truck drive shaft, reduces the speed, transmits the power upward to a point above the frame of the truck, then outward to a point beyond the winch frame, and thence rearward to a counter-shaft of a winch, and which will permit an all oil bath drive from the truck drive shaft to the counter-shaft of the winch.

Another object of this invention is to provide a power take-off for a truck drive shaft which drives upward and rearward so that the winch drums may be located to the rear of the power take-off or over the rear wheels of the truck, so that the weight may be so distributed on the rear wheels as to give better traction and enable the truck to negotiate sand, mud, or other difficult terrain.

Yet another object of the invention is to provide a power take-off that may be readily adapted to various types and makes of trucks, without material alteration in the standard equipment of the truck.

A still further object of this invention is to provide a self contained power take-off unit with the transmission elements fully enclosed in an oil bath, and with the bearings arranged in such manner as to support one end of the tower shaft at a point outside the truck frame, which enables the use of winch drums that are wider than the truck frame.

A further object of the invention is to provide a power take-off that is easy to assemble, to disassemble, and to install, and one on which repairs may readily be made.

With these objects in mind and others that will manifest themselves as the description proceeds, reference is to be had to the accompanying drawings in which like reference characters designate like parts in the several views thereof, in which:

Fig. 1 is a perspective view of the power take-off unit apart from the truck frame;

Fig. 2 is a fragmentary, side elevational view of a truck showing the power take-off unit and the winch drums installed thereon;

Fig. 3 is an enlarged fragmentary, perspective view of a portion of a truck and chain guard assembly, and showing the upper portion of the power take-off and the control lever;

Fig. 4 is a vertical sectional view taken on the line 4—4 of Fig. 1, looking in the direction indicated by the arrows;

Fig. 5 is a sectional view taken on the line 5—5 of Fig. 4, looking in the direction indicated by the arrows;

Fig. 6 is a sectional view taken on the line 6—6 of Fig. 5, looking in the direction indicated by the arrows;

Fig. 7 is a sectional view taken on the line 7—7 of Fig. 4, looking in the direction indicated by the arrows;

Fig. 8 is a sectional view taken on the line 8—8 of Fig. 4, looking in the direction indicated by the arrows; and Fig. 9 is a fragmentary view showing a portion of the power take-off housing and of the truck frame, so as to show the mounting arrangement of the power take-off housing.

With more detailed reference to the drawings the numeral 1 designates generally a truck having the usual drive shaft including a front portion 2 which is connected in driving relation with the engine of the truck. The rear end of the front drive shaft portion 2 is connected in driving relation with the forward end of a front shaft portion of a power take-off drive unit generally designated at 4. The power take-off unit includes a front shaft portion 3 and a rear shaft portion 5. Clutch members 6 and 7 are mounted on the respective adjacent ends of the shaft portions 3 and 5 of the power take-off unit. The clutch 6 is in splined engagement with shaft portion 3 and has teeth thereon to complementarily engage teeth within clutch 7 which clutch 7 is fixed to the shaft portion 5 of the power take-off unit. A clutch shifter yoke 6a is mounted on and secured to a longitudinally movable shifter rod 6b which is slidably mounted in the upper portion of housing 10. The shifter yoke 6a engages in an annular groove 6c in slidable clutch 6 to move the slidable clutch 6 into and out of engagement with the clutch member 7 so as to enable the rear portion 15 of the drive shaft, which drives the rear axle of the truck, to be selectively connected in driving relation with the engine or to be disconnected therefrom.

The front shaft portion 3 of the power take-off unit 10 is journaled in bearings 8 and 9 within housing 10. The rear shaft portion 5 is journaled within bearings 11 and 12 within a tubular housing 13.

The forward end of the shaft portion 3 has a coupling 3a thereon which connects with the rear end of the front portion 2 of the drive shaft. The rear end of the rear shaft portion 5 has a brake drum 14 thereon which connects with rear drive shaft portion 15, as will best be seen in Fig. 2. The drive shaft portion 15 of the truck connects through differential 16 to the rear axle of the truck 1.

The housing 10 has an adjacent integral portion 18 and an outward laterally extending portion 19, as will be more fully described hereinafter.

A transverse cross member 20 extends between the side frames 21 of the truck 1 and has a centrally disposed opening therethrough, through which housing sleeve 13 passes. A reinforcing plate 22 is secured to the cross member 20 and to sleeve 23 so as to support the rear end of the power take-off drive unit 4. A bracket 24 is secured to the other end of the power take-off housing and extends outward. A bolt 25 passes therethrough and through an outstanding lug 26 on one of the frame members 21. Suitable rubber cushions are interposed between the bolt and the bracket and the bracket and the lug so as to support the power take-off housing in such manner as to provide for normal twisting of the truck frame that is inherent in moving over rough terrain, and yet keep the power take-off housing maintained adequately aligned for proper functioning.

The outwardly extending portion 19 of the power take-off housing has outstanding mounting lugs 19a thereon to enable the housing 19 to be secured to one of the frame members 21 of the truck 1, as will best be seen in Fig. 3.

A bevel pinion gear 27 is fixedly secured to the shaft portion 3 of the power take-off unit. A bevel gear shaft 28 is journaled on bearings 29 and 30 within housing 18 at a right angle to shaft portion 3, which bevel gear shaft extends into housing 10 and has a bevel gear 31 fixedly secured thereto for meshing engagement with bevel gear pinion 27. A sprocket 32 is mounted on and fixedly secured to shaft 28 within housing 13.

A tower shaft 33 passes through the upper portion of housing 18 and has one end thereof journaled in bearing 34, and has the other end thereof journaled in bearing 35 in the outer end of housing 19, as will best be seen in Fig. 4. A sprocket 36 is journaled on bearings 36a on tower shaft 33 within housing 18, substantially above, and in driving relation and alignment with sprocket 32. A drive chain 37 passes around sprockets 32 and 36, as will best be seen in Fig. 5. One end of the hub of sprocket 36 has a clutch member 36b therein which clutch is adapted to be complementarily engaged by teeth 38 of slidable clutch member 39 which is in splined sliding engagement with tower shaft 33. A clutch yoke 40 is in engagement with an annular groove in slidable clutch member 39, which yoke is moved by means of clutch lever 41, as will best be seen in Figs. 3 and 8.

The outer end of housing 19 has a flange 42 which journals a chain guard 43 thereon for arcuate movement about the axis of tower shaft 33. A sprocket 44 is fixedly secured to the outer end of tower shaft 33 and is housed within chain guard housing 43. A chain 45 surrounds sprocket 44 and a sprocket mounted on countershaft 46 of winch or hoisting unit designated generally at 47. The sprocket secured to countershaft 46 is within chain guard housing 43 and is in driving relation and alignment with sprocket 44.

The chain guard 43 is fully enclosed and extends rearward so the winch 47 is positioned near or over the rear axle of the truck 1, so the weight may be properly distributed to obtain the best traction and to enable the truck to operate more efficiently on rough terrain, in mud, sand and the like.

The winch 47 is shown to have two drums 48 and 49, which drums are driven by sprockets and chains from counter shaft 46, in a manner well understood in the art.

The tower shaft 33 has a reduced portion 33a on which a V-belt pulley 50 and clutch 51 are mounted. The V-belt pulley 50 normally drives through V-belts 50a to drive an air compressor 52 and the clutch 51 has a V-belt pulley 53 thereon which normally drives a hydraulic pump 54 through V-belts 53a, as will best be seen in Figs. 1 and 4. Other equipment, such as an electric generator, or the like, may be driven off pulley 50, as desired.

An oil fill pipe 55 is provided for the introduction of lubricant into housings 10, 18, and 19, as will best be seen in Figs. 1 and 4.

With the oil introduced into housings 10 and 18 until bevel gear 31 and sprocket 32 are at least partially immersed therein, the oil will be directed upward by action of chain 37 and mist created thereby will lubricate the bearings in the upper portion of housing 18 and in laterally extending housing 19.

With oil introduced into chain guard housing 43 until sprocket 44 is at least partially immersed, chain 45 will be lubricated thereby and will direct oil into the sprocket secured to countershaft 46. In this manner it will be seen that the entire driving mechanism within power take-off housing and connected thereto for driving the winching mechanism, is adequately lubricated by an oil bath at all times.

The present power take-off is designed primarily for driving the winch mechanism or the like mounted thereon and is designed in such manner that the power may be directed upward between the relatively closely spaced truck frame members 21, to a point above the truck frame, then laterally outward a substantial distance outside the truck frame, thence rearward to a winch, which may be mounted substantially over or near the rear axle of the truck, and since the moving of the machinery from place to place requires only a small percent of the operating time of the truck as compared to the time spent in driving the winch mechanism for servicing or drilling wells, it is therefore important that a piece of heavy duty equipment be designed to fit into a relatively narrow space between the truck frames and since the driving of the winch is the primary purpose of the power take-off unit, the bevel gear pinion 27 and bevel gear 31 are in mesh at all times and are driven, together with sprockets 32 and 36 at all times that the engine is in driving engagement with the front drive shaft portion 2, whether or not the clutch members 6 and 7 are engaged. However, by disengaging the clutch 38, the sprocket 36 will idle on tower shaft 33, which is the usual arrangement while clutch 6 is engaged with clutch 7 to move the truck and winch from one location to another.

*Operation*

The present power take-off 4, which is associated with a truck 1 and a winch or hoisting mechanism 47, is primarily used to drive the winch or hoisting mechanism, and the "roading" of the vehicle is secondary, as usually the moving of the equipment from one well location to another consumes comparatively short and infrequent periods of time as compared to the time spent in cleaning out, drilling the well, and the like.

In order to drive the truck from place to place, the drive shaft thereof is coupled, by a coupling 3a to shaft portion 3 of the power take-off unit which is journalled in power take-off housing 10. A clutch 6 is sildably engaged with clutch member 7 on the shaft portion 5 of the power take-off unit so as to form a unitary drive through power take-off housing 10. The drive shaft portion 15 is coupled to brake drum 14 which forms a drive to differential 16 to drive the rear axle of the truck in the usual manner. At all times the drive shaft portion 2 is turning, the bevel gear pinion 27 will drive bevel gear 31 which is fixedly secured to bevel gear shaft 28, and since chain 37 surrounds sprocket 32 on bevel gear shaft 28 and sprocket 36 on tower shaft 33, the sprocket 36 will be driven as the truck moves over the terrain. The sliding clutch 38 may be selectively engaged with clutch 36b to drive tower shaft 33 while the truck is being moved over the terrain, if desired. However, this is not usually practiced, except under special conditions.

When the truck has been driven to the location at which the mechanism is to operate, the clutch member 6 is disengaged from clutch member 7 by shifting the rod 6b forward, which will enable the shaft portion 2 to be driven by the engine, when the truck transmission T is in the desired gear and the clutch is engaged. With the clutch of the engine disengaged, the sliding clutch member 39 on the tower shaft 33 may be moved into engagement with clutch member 36b on sprocket 36, where, upon the release of the truck clutch to cause the shaft under it to rotate, the tower shaft 33 and sprocket 44 will be driven at the desired speed in the desired direction, so as to selectively operate winch drums 48 and 49 in a manner well understood in the art. As the winch clutches to enable the engagement of the respective drums in driving relation with countershaft 46, they will thus drums 48 and 49 are usually provided with individual perform the desired well servicing operation.

The V-belt pulley 50 continuously drives an air compressor unit 52, which air compressor may be of a character that will have an automatic disengaging clutch, when the air pumped by the compressor has reached a predetermined pressure. The hydraulic pump 54 may be selectively engaged by clutch 51 so as to furnish the necessary hydraulic fluid pressure to raise the mast or the like.

It will be readily appreciated that by utilizing an outboard bearing 35 near the outer end of housing 19, that the tower shaft 33 may be extended outward a substantial distance to drive the countershaft and the winch drums, which are substantially wider than the truck frame, thereby enabling greater spooling capacity on the drums than would be possible to spool on which drums that are confined to the width of the truck frame.

It is further to be pointed out that by having the tower shaft arranged to extend outward and beyond the outer confines of the truck frame, the winch or hoisting mechanism 47 may be positioned on the frame at any point rearward of the power take-off so as to enable the balancing of the load in order to meet the legal road requirements of many states, and at the same time give the best balance of weight with respect to the truck axles.

While the power take-off unit has been illustrated and described in some detail in one embodiment thereof, it is to be understood that changes may be made in the minor details of construction and adaptations made to different installations without departing from the spirit of the invention or the scope of the appended claims.

Having thus described the invention, what is claimed is:

1. A power take-off for a truck having a frame and front and rear drive shaft portions, which power take-off has a housing, mounting means for securing said housing to the frame of said truck, front and rear shaft portions within said housing in axial alignment with said drive shaft portions, said power take-off shaft portions being adapted to be connected at their outer ends to the respective adjacent ends of said drive shaft portions, a clutch member fixed against rotation on each of the adjacent ends of the power take-off shaft portions, each clutch member being rotatable with its respective shaft portions, shifter means for engaging and disengaging one of said clutch members with the other of said clutch members, a first gear on said front power take-off shaft portion, which last-mentioned shaft portion is connected to the engine of said truck in driving relation, a shaft journaled in said housing at a right angle to last-mentioned shaft portion, a second gear fixedly secured to said right angle disposed shaft and in driving engagement with said first gear, a tower shaft journaled in said power take-off housing transversely with respect to and above said power take-off shaft portions, a sprocket journaled on said tower shaft, a sprocket fixed on said right angle disposed shaft below said sprocket on said tower shaft, a drive chain connecting said sprockets in driving relation, a clutch member on said sprocket journaled on said tower shaft, a complementary clutch member slidable on said tower shaft and fixed against rotation with respect thereto, clutch shifter means for moving said complementary clutch member with respect to said clutch member on said sprocket, and bearing means for journaling said tower shaft at a point exterior the frame of said truck.

2. A power take-off as defined in claim 1, said first and second gears being bevel gears.

3. In a power take-off for a truck having a frame, a front drive shaft portion and a rear drive shaft portion, said power take-off having a housing, mounting means for securing said housing to said truck frame, shaft means passing through said power take-off housing and in axial alignment with and operatively connected to said front and said rear drive shaft portions, clutch means within said housing for operatively connecting said front drive shaft portion to said rear drive shaft portion and disconnect said front drive shaft portion from said rear drive shaft portion, a pinion gear fixed on said shaft means in said housing and being in driving relation at all times with said front drive shaft portion, a further shaft journaled within said housing, a second gear fixed on said further shaft and in driving relation with said pinion gear, a third gear fixed on said further shaft and adapted to drive upwardly within said housing, a transverse shaft journaled in said housing substantially above said further shaft and above said truck frame, a fourth gear journaled on said transverse shaft and connected in driving relation with said third gear, clutch means in engagement with said transverse shaft and adapted to selectively engage said fourth gear in driving relation with said shaft, means for selectively engaging said last-mentioned clutch means with said fourth gear, said transverse shaft extending outward from said housing and having gearing exteriorly mounted thereon, and transmission means connected to said exterior gearing and adapted to drive gearing spaced longitudinally of said frame to a point remotely spaced from said power take-off.

4. A power take-off as defined in claim 3, including further clutch means on said transverse shaft outside said housing and adapted to operatively connect and disconnect said transverse shaft and said last-mentioned gearing.

5. In a power take-off for a truck having a frame, a front drive shaft portion and a rear drive shaft portion, said power take-off having a housing, shaft means extending through said power take-off housing and in axial alignment with and operatively connected to said front and said rear drive shaft portions, a further shaft journaled within said housing, gearing connecting said shaft means and said further shaft in driving relation, a transverse shaft journaled in said housing substantially above said further shaft and above said truck frame, a clutch on said transverse shaft for selectively operatively connecting and disconnecting said further shaft and said transverse shaft, said transverse shaft extending outward from said housing and having gearing exteriorly mounted thereon and secured thereto, and transmission means connected to said exterior gearing and adapted to drive gearing spaced longitudinally of said truck frame to a point remotely spaced from said power take-off.

6. A power take-off as defined in claim 5, the lower portion of said housing forming a container adapted to receive lubricant therein to an amount sufficient to at least partially cover said first-mentioned gearing.

7. A power take-off as defined in claim 5, wherein a lateral housing extends outward from said first-mentioned housing, which lateral housing surrounds said transverse shaft, said laterally extending housing having a bearing mounted therein near the outer end thereof and journaling said transverse shaft, and means supporting said laterally extending housing on said truck frame.

8. In a power take-off for a truck having a frame, a front drive shaft portion and a rear drive shaft portion, said power take-off having a housing, shaft means extending through said power take-off housing and in axial alignment with and operatively connected to said front and said rear drive shaft portions, a further shaft journal within said housing, gearing connecting said shaft means and said further shaft in driving relation, a transverse shaft journaled in said housing substantially above said further shaft and above said truck frame, said transverse shaft extending outward from said housing and having gearing exteriorly mounted thereon, and clutch means operatively interposed between said exterior gearing on said transverse shaft and said further shaft, so as to selectively drive or disengage said exterior gearing.

References Cited in the file of this patent

UNITED STATES PATENTS

| | | |
|---|---|---|
| 1,293,711 | Church | Feb. 11, 1919 |
| 1,301,224 | Bush | Apr. 22, 1919 |